(12) United States Patent
Aunio

(10) Patent No.: US 6,567,020 B2
(45) Date of Patent: May 20, 2003

(54) METHOD AND ARRANGEMENT FOR REDUCING INTERFERENCE

(75) Inventor: Antti Aunio, Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/941,320

(22) Filed: Aug. 28, 2001

(65) Prior Publication Data

US 2002/0064243 A1 May 30, 2002

(30) Foreign Application Priority Data

Aug. 30, 2000 (FI) .................................................. 001913

(51) Int. Cl.⁷ ................................................ H03M 9/00
(52) U.S. Cl. ........................ 341/100; 341/101; 341/144; 341/155
(58) Field of Search ................................ 341/143, 100, 341/101, 144, 155

(56) References Cited

U.S. PATENT DOCUMENTS

| | | | |
|---|---|---|---|
| 4,670,792 A | 6/1987 | Dureigne et al. | 358/280 |
| 4,908,838 A | 3/1990 | Mizoguchi | 375/15 |
| 4,983,965 A | 1/1991 | Doi et al. | 341/72 |
| 5,050,474 A * | 9/1991 | Ogawa et al. | 341/143 |
| 5,136,587 A | 8/1992 | Obana et al. | 370/112 |
| 5,333,136 A * | 7/1994 | Ahn | 370/520 |
| 5,541,665 A * | 7/1996 | Urata et al. | 348/571 |
| 6,031,473 A * | 2/2000 | Kubinec | 341/100 |
| 6,160,859 A * | 12/2000 | Martin et al. | 375/435 |
| 6,172,632 B1 * | 1/2001 | Carter, IV | 341/147 |
| 6,202,108 B1 * | 3/2001 | Autechaud et al. | 710/61 |

FOREIGN PATENT DOCUMENTS

| | | | |
|---|---|---|---|
| EP | 0092083 A2 | 10/1983 | |
| WO | WO 00/70768 | 11/2000 | H03M/15/14 |

OTHER PUBLICATIONS

Patent Abstracts of Japan Publication No. JP 06085762.
Patent Abstracts of Japan Publication No. JP 07123368.
Patent Abstracts of Japan Publication No. JP 07212229.

* cited by examiner

Primary Examiner—Peguy JeanPierre
(74) Attorney, Agent, or Firm—Perman & Green, LLP

(57) ABSTRACT

The invention relates to a method and an arrangement for reducing interference created in an output signal in connection with signal conversion. The arrangement may employ two structural sets, whereof the arrangement comprises at least one. The first structural set comprises a modulator (10) arranged to modulate the signal, and a DA converter (30) arranged to convert the serial-mode input signal arriving from the modulator into an analogue output signal. In addition, the first structural set comprises a serial/parallel converter (20) arranged to convert the modulated signal into parallel mode, and a divider (40) for generating a clock signal, the frequency of the clock signal generated by the divider being lower than the frequency of the clock signal used in serial-mode input signal transmission. The divider (40) is arranged to simultaneously clock several signals to the DA converter (30). The second structural set comprises an AD converter (70) arranged to convert an analogue input signal into several parallel digital output signals. In addition, the second structural set comprises a parallel/serial converter (80) arranged to receive several simultaneously arriving digital signals for conversion into serial-mode signals using a clock signal, the frequency of which being lower than the frequency of the clock signal used in serial-mode signal transmission.

12 Claims, 2 Drawing Sheets

METHOD AND ARRANGEMENT FOR REDUCING INTERFERENCE

FIELD OF THE INVENTION

The invention relates to a method for reducing interference created in an output signal in connection with signal conversion.

BACKGROUND OF THE INVENTION

It is more likely for data transmission to cause various forms of interference when a higher transmission rate is used. Fast bus structures in particular cause interference, as high clock frequencies are used in signal transmission. The use of a serial bus in particular creates noise and interference to the apparatuses close to the bus, when the data rate of the signals to be-transmitted on the bus increases too much.

BRIEF DESCRIPTION OF THE INVENTION

It is an object of the invention to provide a method and an arrangement so as to solve the above problems. This is achieved with the method of the type set forth in the preamble, characterized in that in order to carry out the method two sets of process steps can be employed, whereof at least one is performed in this method, the first set of process steps comprises the step of generating a digital modulated input signal in serial mode which is converted into parallel mode, and simultaneously several digital signals are transferred using a clock signal for conversion into analogue output signals, the frequency of the clock signal being lower than the frequency of the clock signal used in serial-mode signal transmission, the second set of process steps comprises the step of receiving analogue input signal, which is converted into several parallel digital output signals which are simultaneously transferred using a clock signal for conversion into serial mode signals, the frequency of the clock signal being lower than the frequency of the clock signal used in serial-mode signal transmission.

The invention also relates to an arrangement for reducing interference in an output signal in connection with signal conversion.

The arrangement of the invention is characterized in that the arrangement may employ two structural sets, whereof the arrangement comprises at least one, the first structural set comprises a modulator arranged to modulate the signal, and a DA converter arranged to convert the serial-mode input signal arriving from the modulator into an analogue output signal, and a serial/parallel converter arranged to convert the modulated signal into parallel mode, and a divider for generating a clock signal, the frequency of the clock signal generated by the divider being lower than the frequency of the clock signal used in serial-mode input signal transmission, and the divider is arranged to simultaneously clock several signals to the DA converter, and the second structural set comprises an AD converter arranged to convert an analogue input signal into several parallel digital output signals, and a parallel/serial converter arranged to receive several simultaneously arriving digital signals for conversion into serial mode signals using a clock signal, the frequency of which being lower than the frequency of the clock signal used in serial-mode signal transmission.

The preferred embodiments of the invention are disclosed in the dependent claims.

The invention is based on the idea to convert a signal into parallel mode, and thereafter to perform the required conversion for the signal, whereby a lower clock frequency can be used in signal transmission.

Several advantages can be achieved with the method and arrangement of the invention. A serial-mode signal is converted into parallel mode before carrying out a DA conversion, whereby the clock frequency of the clock signal used in analogue signal transmission can be reduced. Another advantage is that several signals can be simultaneously transmitted to a DA converter using a clock signal, the frequency thereof being lower than the frequency of the clock signal used in serial-mode signal transmission, in which case interference possibly created to the converted analogue signal can be reduced.

The arrangement of the invention is easy to implement, for example using discrete components. The analogue signals are transferred to a bus, which may also reduce the interference caused by the signals to be transmitted. A clock signal, having a frequency that is lower than the frequency of the clock signal used in serial-mode signal transmission, is used for transferring each signal on the bus.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

Figure 1:
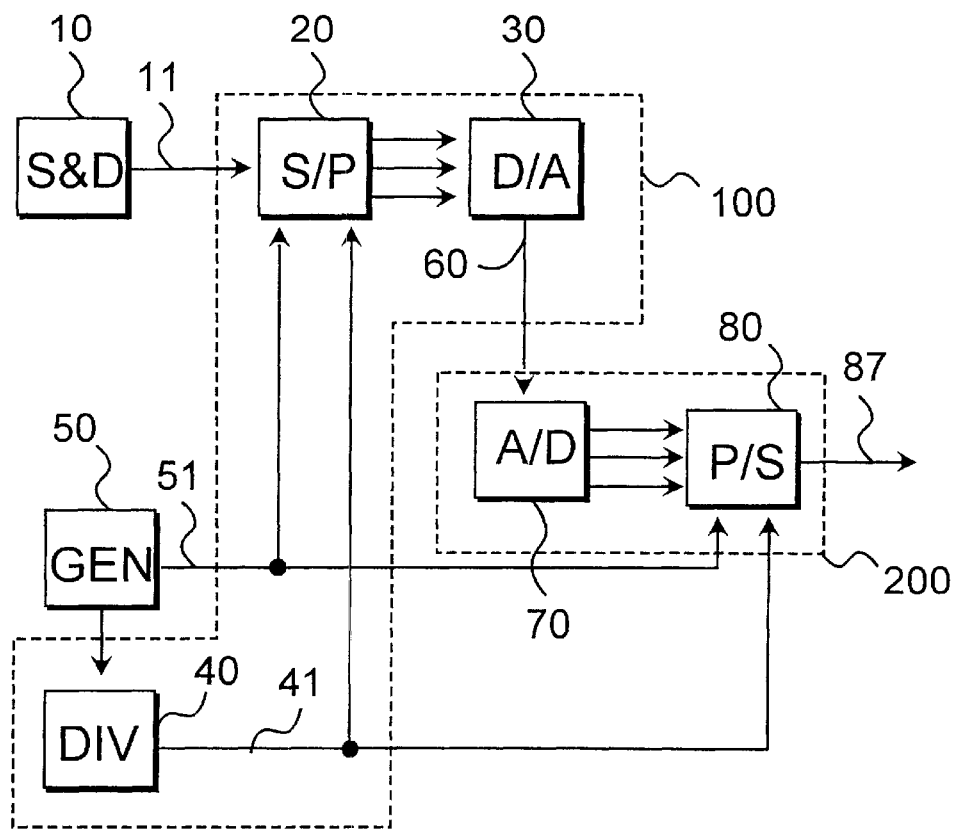
FIG. 1 shows an alternative implementation of the arrangement.

With reference to FIG. 1 the arrangement comprises a modulator 10, a serial/parallel converter 20, a DA converter 30, a divider 40, a clock generator 50, a bus 60, an AD converter 70 and a parallel/serial converter 80. In the implementation shown in the Figure, the serial/parallel converter 20, the DA converter 30 and the divider 40 are placed into an ASIC circuit 100 (ASIC=Application Specific integrated Circuit). The AD converter 70 and the parallel/serial converter 80 are in turn placed into an ASIC circuit 200. The arrangement can also be implemented for one ASIC circuit.

The modulator 10 is preferably a sigma-delta modulator, but the modulator can be of another type too. The blocks in the ASIC circuit 100 belong to the first structural set of the arrangement, which also comprises the modulator. The blocks in the ASIC circuit 200 belong to the second structural set.

FIG. 1 shows that an output signal 11 of the sigma-delta modulator 20 is connected to the input side of the serial/parallel converter 20. The signal generated by the modulator is preferably of PDM type (PDM=Pulse Density Modulation) or of PWM type (=Pulse Width Modulation). Each modulation result of the modulator 10 comprises one or more bits. The modulation result preferably comprises as few bits as possible. In the implementation alternative shown in FIG. 1 the modulation result preferably includes one bit.

FIG. 1 also shows that the output side of the converter 20 is connected to the input side of the DA converter 30. In addition, the output side of the AD converter 70 is connected to the input side of the parallel/serial converter 80. The bus 60 is connected from the output side of the DA converter 30 to the input side of the AD converter 70. The bus, which is analogue, allows the ASIC circuits to be connected with one another.

A clock generator 50 is connected to the serial/parallel converter 20. The clock generator 50 generates a clock signal 51, and the pace determined by the clock signal is used to transfer the output signal 11 generated by the modulator towards the input side of the serial/parallel converter 20. The same clock signal 51 is also conveyed to the parallel/serial converter 80, which generates a serial-mode signal 87. A clock signal 41 generated by the divider 40 is also connected to the serial/parallel converter 20 and the serial/parallel converter 80.

Figure 2:
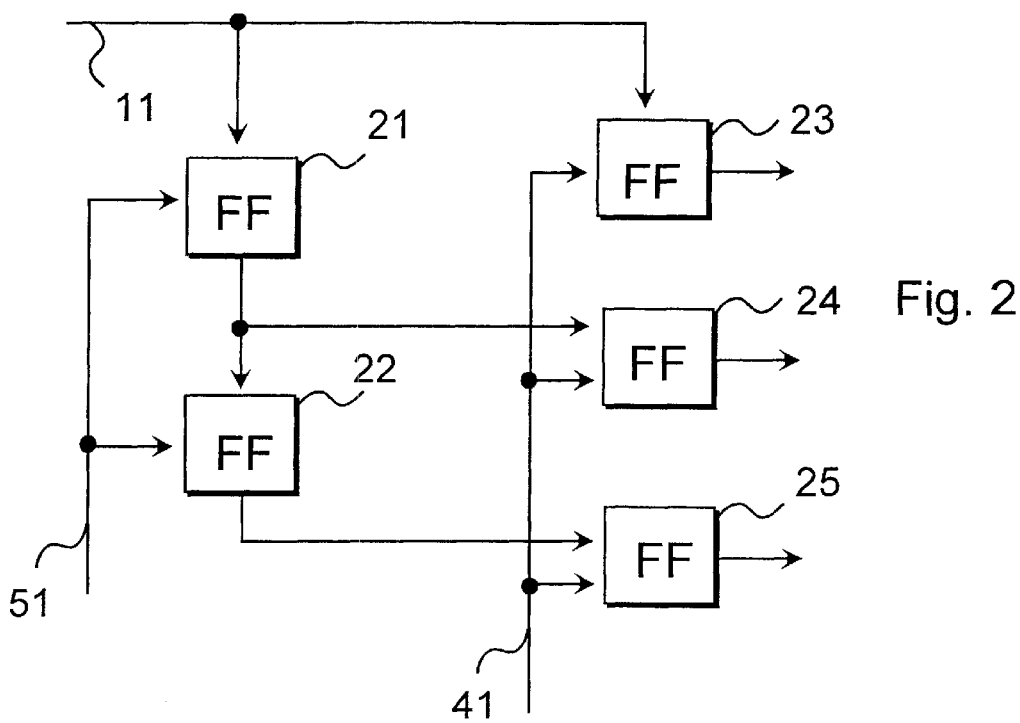
FIG. 2 shows in detail a serial/parallel converter.

FIG. 2 shows a serial/parallel converter. FIG. 2 illustrates that the serial/parallel converter 20 is at least partly implemented using flip-flop circuits. The converter can also be implemented using other than flip-flop circuits. The parallel/serial converter 80 can also be implemented, for example, using flip-flop circuits.

The serial/parallel converter 20 comprises flip-flop circuits 21, 22, 23, 24 and 25, each one of which comprises a data input, a data output and a clock input. To be more precise, the internal coupling of the converter is the following. The input of circuit 21 and the inputs of circuit 23 are connected together. The output of circuit 21 is connected to the input of circuit 22 and to the input of circuit 24. The output of circuit 22 is connected to the input of circuit 22. FIG. 2 also shows that a signal 41 is connected to the circuits 23, 24 and 25. The outputs of circuits 23, 24 and 25 are connected to the DA converter 30 as illustrated in FIG. 1.

With reference to FIG. 2, a clock signal 51, which may have a frequency of 30 MHz, generated by the clock generator 50 is conveyed as such to the clock inputs of circuits 21 and 22. The clock signal being supplied to circuits 21 and 22 is also conveyed to the divider 40, which divides the frequency of the clock signal that it has received by an integer value. If the converter is three bits in length, said integer value is three.

The divider 40 generates the clock signal 41 having a frequency that is lower than the frequency of the clock signal being supplied to circuits 21 and 22. If the divider divides the 30 MHz clock frequency it has received by for example three, then a clock signal is obtained from the divider output whose frequency is 10 MHz. The clock signal generated by the divider is conveyed to a specific clock input in each circuit 23, 24, 25.

Since circuits 23, 24, 25 are clocked with the same clock, the output signal of each circuit simultaneously propagates to the DA converter. The serial/parallel converter 20 forms a delay line, which delays the signals arriving from the modulator. The serial/parallel conversion allows the chance to use the DA converter in the system. The DA converter comprises parallel inputs and parallel outputs. The parallel outputs form a bus 60, which is used when the signals formed by the DA converter 20 propagate to the AD converter 70.

With reference to FIG. 1 the bus 60 comprises at least one signal path, in which analogue signal comprising various signal levels is transferred. The type of the analogue signal may be a current signal or a voltage signal. As each signal to be transferred on the signal path is clocked using a clock signal generated by the divider, the clock signal being smaller than the clock frequency used when transferring the output signal of the modulator, then the creation of high frequency noise to the DA-converted signal can be reduced. To be more precise, the created interference remains on the bus at low frequencies, and do not therefore interfere with other apparatuses, for example. The created interference may be for example noise, which is not disturbing, since the interference is of low frequency type. In this case the signal on the signal path of the bus is clocked only using a 10 MHz clock signal.

The method of the invention is applicable to be used both on the DA and AD converter sides. The outputs of the DA and AD converters may be, for example, differential. In addition, at least the AD converter is capable of receiving differential signals too. The arrangement may comprise several parallel DA converters, as well as several parallel AD converters. An AD converted signal can after being converted into serial mode be demodulated, for example, in a sigma delta demodulator.

In an alternative implementation the arrangement comprises for example two three-bit D/A converters, which are in parallel. If the serial/parallel converter 20 in the above arrangement receives a two-bit input signal, a six-bit signal is transferred in one go towards the D/A converter. In a situation described above the divider generates a clock signal, which is a sixth of the clock signal that is correspondingly used for clocking a two-bit input signal to the serial/parallel converter 20. In the implementation alternative shown in FIG. 1, a one-bit signal arrives at the serial/parallel converter 20, and said signal is converted into a three-bit signal, which is conveyed to the D/A converter for conversion into an analogue signal.

The AD converter 70 receives the analogue signals arriving from the DA converter 30 and converts them into digital mode. In this case the AD converter simultaneously transmits three of the digital signals it has generated in one go to the parallel/serial converter 80 for conversion.

Figure 3:
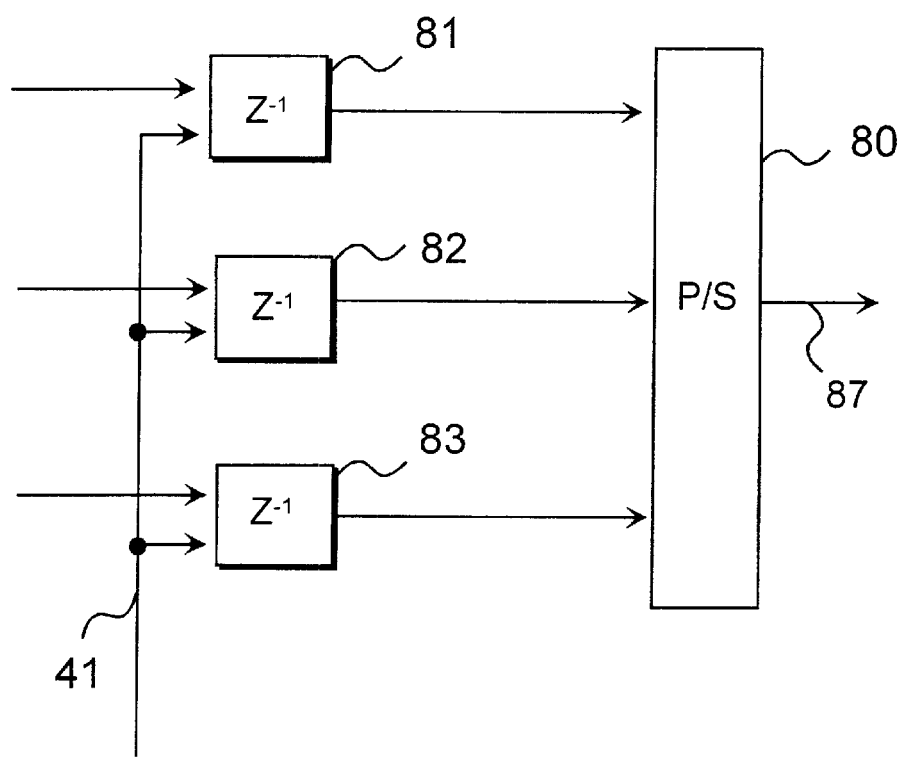
FIG. 3 shows the arrangement in detail.

FIG. 3 shows in more detail the arrangement comprising circuits 81, 82, 83, each one of which comprises a specific data input, a data output and a clock input. The circuits 81, 82, 83 are located between the AD converter 70 and the parallel/serial converter 80. The input of each circuit 81, 82, 83 is connected to different outputs in the AD converter. In addition, the clock inputs of the circuits 81, 82, 83 that receive signal from the divider are connected to one another. The circuits 81, 82, 83 are for example flip-flop circuits.

In the implementation alternative shown in FIG. 3, three output signals of the AD converter 70 are simultaneously clocked in one go to the circuits 81, 82 and 83 so that each circuit receives one of the signals. The circuits 81, 82 and 83 are clocked using a clock signal 41 generated by the divider, the clock signal being the same as the one used for clocking the circuits 23, 24 and 25. The divider is thus arranged to simultaneously clock several output signals converted by the AD converter for conversion into parallel/serial mode.

A data signal 87 with a data rate equalling the data rate of the signal 11 is obtained from the output of the parallel/serial converter 80 in the implementation alternative of FIG. 3. In signal transmission a clock signal is here used for the circuits 81, 82 and 83, the frequency of said clock signal forming a third of the frequency of the clock signal used for transferring the signal 87. Signal is clocked for the circuits 81, 82 and 83 as well as for the parallel/serial converter 80 using the clock signal generated by the divider. The frequency of said clock signal is lower than the clock frequency of the signal used for transferring the output signal 87 of the parallel/serial converter 80.

The method comprises two sets of process steps, whereof at least one is performed in the method in order to carry out the method of the invention. A modulated digital output signal in serial mode is generated in the first set of process steps, the output signal being converted into parallel mode. The parallel mode signal is transferred for conversion into analogue mode using a clock signal, whose frequency is lower than the frequency of the clock signal used in serial-mode signal transmission.

Analogue input signal is received in the second set of process steps, and the input signal is converted into several parallel digital output signals. The generated digital signals are simultaneously transferred for conversion into serial-mode signals using a clock signal, whose frequency is lower than the frequency of the clock signal used in serial-mode signal transmission.

Even though the invention has been described above with reference to the example of the accompanying drawings, it is obvious that the invention is not restricted thereto but can be modified in various ways within the scope of the inventive idea disclosed in the attached claims.

What is claimed is:

1. A method for reducing interference created in transmission of a serial digital signal from a transmitting end to a receiving end via a bus, the method comprising:

at the transmitting end, converting the serial digital signal into a parallel digital signal, and converting the parallel digital signal into an analogue signal, the frequency of the analogue signal being lower than the frequency of the serial digital signal;

transmitting the analogue signal from the transmitting end to the receiving end via the bus; and at the receiving end, converting the analogue signal into a parallel digital signal, and converting the parallel digital signal into the serial digital signal.

2. The method as claimed in claim 1, wherein the serial digital signal is generated using sigma-delta modulation.

3. The method as claimed in claim 1, wherein the serial digital signal is delayed when converting the serial digital signal into parallel digital signal.

4. The method as claimed in claim 1, wherein each generated analogue signal is transferred to the bus, where each signal is transferred using a clock signal having a frequency that equals the one in the clock signal which is used for clocking signals for conversion into parallel mode.

5. The method as claimed in claim 1, wherein the parallel digital signal is converted into an analogue output voltage.

6. The method as claimed in claim 1, wherein the parallel digital signal is converted into an analogue output current.

7. The arrangement for reducing interference created in transmission of a serial digital signal from a transmitting end to a receiving end via a bus, the arrangement comprising:

a modulator for creating the serial digital signal, at the transmitting end a serial/parallel converter for converting the serial digital signal into a parallel digital signal, and a DA converter for converting the parallel digital signal into an analogue signal, the frequency of the analogue signal being lower than the frequency of the serial digital signal, the analogue signal being transmitted from the transmitting end to the receiving end in the bus;

at the receiving end, an AD converter for converting the analogue signal into a parallel digital signal, and a parallel/serial converter for converting the parallel digital signal into a serial digital signal; and a divider for generating a clock signal for the serial/parallel converter and for the parallel/serial converter.

8. The arrangement as claimed in claim 7, wherein the modulator is a sigma-delta modulator.

9. The arrangement as claimed in claim 7, wherein the serial/parallel converter is arranged to delay the serial digital signal.

10. The arrangement as claimed in claim 7, wherein the bus is a parallel bus, and the divider is arranged to transfer the signals in the parallel bus using a clock signal, whose frequency equals the frequency of the clock signal that clocks the signals to the DA converter and from the AD converter.

11. The arrangement as claimed in claim 7, wherein the DA converter is arranged to convert the parallel digital signal into an analogue output voltage.

12. The arrangement as claimed in claim 7, wherein the DA converter is arranged to convert the parallel digital signal into an analogue output current.

* * * * *